United States Patent
Okamoto et al.

(10) Patent No.: US 10,544,862 B2
(45) Date of Patent: *Jan. 28, 2020

(54) STARTING METHOD FOR VARIABLE SPEED ACCELERATOR AND STARTING CONTROL DEVICE FOR VARIABLE SPEED ACCELERATOR

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Kobayashi, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/739,060

(22) PCT Filed: Feb. 26, 2016

(86) PCT No.: PCT/JP2016/055819
§ 371 (c)(1),
(2) Date: Dec. 21, 2017

(87) PCT Pub. No.: WO2017/038119
PCT Pub. Date: Mar. 9, 2017

(65) Prior Publication Data
US 2018/0187778 A1 Jul. 5, 2018

(51) Int. Cl.
*F16H 3/72* (2006.01)
*F16H 61/66* (2006.01)
(Continued)

(52) U.S. Cl.
CPC .............. *F16H 61/66* (2013.01); *F16H 3/724* (2013.01); *F16H 3/725* (2013.01); *F16H 3/728* (2013.01);
(Continued)

(58) Field of Classification Search
CPC .......... F16H 3/724; F16H 3/725; F16H 61/12; F16H 61/66; F16H 2200/2005;
(Continued)

(56) References Cited

U.S. PATENT DOCUMENTS 2,578,015 A 12/1951 Reinhard
2,916,642 A 12/1959 Macks
(Continued)

FOREIGN PATENT DOCUMENTS

DE 1963220 A1 7/1970
DE 2236588 A1 * 2/1974 ............. H02K 7/116
(Continued)

OTHER PUBLICATIONS

Machine translation of FR 2194064 A1. (Year: 2018).*
(Continued)

*Primary Examiner* — Jeffrey A Shapiro
(74) *Attorney, Agent, or Firm* — Osha Liang LLP

(57) ABSTRACT

A starting method for a variable speed accelerator includes an electric device that generates a rotational drive force, and a transmission device that shifts the rotational drive force generated by the electric device to transmit the changed speed to an object to be driven. The transmission device includes a sun gear that rotates about an axis, a sun gear shaft that is fixed to the sun gear and extends in an axial direction, a planetary gear that meshes with the sun gear, revolves around the axis, and rotates about its own center axis, and an internal gear that has a plurality of teeth aligned annularly about the axis and meshes with the planetary gear.

4 Claims, 9 Drawing Sheets

(51) Int. Cl.
*H02P 5/747* (2006.01)
*H02K 7/116* (2006.01)

(52) U.S. Cl.
CPC .............. *H02K 7/116* (2013.01); *H02P 5/747* (2013.01); *F16H 3/727* (2013.01); *F16H 2061/6603* (2013.01); *F16H 2200/2005* (2013.01)

(58) Field of Classification Search
CPC .. F16H 2061/6603; F16H 3/727; F16H 3/728; H02P 5/747; H02P 7/116; H02P 61/0202; H02P 7/343; H02P 7/347; H02P 9/00; H02K 61/0202; H02K 7/1185; B60W 10/08; B60W 10/105; B60W 10/115
USPC ........................................................ 475/4, 5
See application file for complete search history.

(56) References Cited

U.S. PATENT DOCUMENTS

| | | | |
|---|---|---|---|
| 3,575,805 | A | 4/1971 | Dempsey |
| 5,062,824 | A | 11/1991 | Rokopius |
| 5,090,261 | A | 2/1992 | Nakatsukasa |
| 5,947,854 | A | 9/1999 | Kopko |
| 6,358,172 | B1 | 3/2002 | Hiegemann |
| 6,555,927 | B1 | 4/2003 | Suzuki et al. |
| 6,808,468 | B1 | 10/2004 | Miyazaki et al. |
| 7,207,919 | B2 | 4/2007 | Tsuneyoshi et al. |
| 7,322,891 | B1 | 1/2008 | Prewitt |
| 7,609,011 | B2 | 10/2009 | Yatabe et al. |
| 10,177,692 | B2 * | 1/2019 | Kobayashi ............. H02K 7/116 |
| 2003/0064847 | A1 | 4/2003 | Oshidari et al. |
| 2005/0113201 | A1 | 5/2005 | Kimura et al. |
| 2006/0019756 | A1 | 1/2006 | Lattin |
| 2006/0264296 | A1 | 11/2006 | Moeller |
| 2007/0155570 | A1 * | 7/2007 | Kimura ................... F16H 3/724 475/153 |
| 2007/0191169 | A1 | 8/2007 | Fujita et al. |
| 2009/0010094 | A1 | 1/2009 | Uemura |
| 2009/0230903 | A1 * | 9/2009 | Yamamoto ........ H02M 7/53875 318/400.3 |
| 2013/0249444 | A1 | 9/2013 | Golding |
| 2014/0194214 | A1 | 7/2014 | Maeda |
| 2017/0141706 | A1 | 5/2017 | Kobayashi et al. |
| 2017/0155345 | A1 | 6/2017 | Kobayashi et al. |
| 2018/0105064 | A1 * | 4/2018 | Matsubara ............ B60L 15/007 |

FOREIGN PATENT DOCUMENTS

| | | |
|---|---|---|
| DE | 19751231 A1 | 6/1999 |
| EP | 1961602 A1 | 8/2008 |
| FR | 822746 A | 1/1938 |
| FR | 2094518 A5 | 2/1972 |
| FR | 2194064 A1 * | 2/1974 ............. H02K 7/116 |
| GB | 407760 A | 3/1934 |
| JP | S59-070497 A | 4/1984 |
| JP | S59-70497 A | 4/1984 |
| JP | H01-176247 U | 12/1989 |
| JP | H03-73745 U | 7/1991 |
| JP | H07-135701 A | 5/1995 |
| JP | 2000-324607 A | 11/2000 |
| JP | 2001-152901 A | 6/2001 |
| JP | 2003-34153 A | 2/2003 |
| JP | 2004-116542 A | 4/2004 |
| JP | 2004-150609 A | 5/2004 |
| JP | 2005-153727 A | 6/2005 |
| JP | 2006-38228 A | 2/2006 |
| JP | 2006-521517 A | 9/2006 |
| JP | 4183481 B2 | 11/2008 |
| JP | 4472350 B2 | 6/2010 |
| JP | 2010-242811 A | 10/2010 |
| JP | 2014-87170 A | 5/2014 |
| WO | 01-85483 A1 | 11/2001 |
| WO | 03-071160 A1 | 8/2003 |
| WO | 03/071160 A1 | 8/2003 |
| WO | 2013-035172 A1 | 3/2013 |
| WO | 2016-009668 A1 | 1/2016 |
| WO | 2016-010146 A1 | 1/2016 |

OTHER PUBLICATIONS

International Search Report issued in corresponding International Application No. PCT/JP2016/055819 dated May 31, 2016 (3 pages).
International Search Report issued in corresponding International Application No. PCT/JP2015/075181 dated Nov. 17, 2015 (4 pages).
Written Opinion issued in corresponding International Application No. PCT/JP2016/055819 dated May 31, 2016 (7 pages).
Written Opinion issued in corresponding International Application No. PCT/JP2015/075181 dated Nov. 17, 2015 (7 pages).
International Search Report and Written Opinion in corresponding International Application No. PCT/JP2015/055064, dated May 19, 2015 (25 pages).
International Search Report and Written Opinion in corresponding International Application No. PCT/JP2014/069253, dated Sep. 22, 2014 (20 pages).
International Search Report and Written Opinion in corresponding International Application No. PCT/JP2015/070580, dated Sep. 29, 2015 (29 pages).
Non-Final Office Action in corresponding U.S. Appl. No. 15/320,228, dated Oct. 18, 2018 (26 pages).
Non-Final Office Action in corresponding U.S. Appl. No. 15/320,228, dated Apr. 18, 2019 (15 pages).
Final Office Action in corresponding U.S. Appl. No. 15/320,228, dated Sep. 6, 2019 (12 pages).
Non-Final Office Action in corresponding U.S. Appl. No. 15/320,905, dated Jan. 10, 2018 (26 pages).
Corrected Notice of Allowability in corresponding U.S. Appl. No. 15/320,905, dated Oct. 17, 2018 (4 pages).
Corrected Notice of Allowability in corresponding U.S. Appl. No. 15/320,905, dated Dec. 5, 2018 (4 pages).

* cited by examiner

STARTING METHOD FOR VARIABLE SPEED ACCELERATOR AND STARTING CONTROL DEVICE FOR VARIABLE SPEED ACCELERATOR

Priority is claimed on PCT/JP2015/075181, filed Sep. 4, 2015, the content of which is incorporated herein by reference.

TECHNICAL FIELD

The present invention relates to a starting method for a variable speed accelerator, and a starting control device for a variable speed accelerator.

BACKGROUND ART

As devices that drive rotary machines, such as a compressor, there are devices including an electric device that generates a rotational drive force, and a transmission device that shifts the rotational drive force generated by the electric device to transmit the changed speed to rotary machines.

Patent Document 1 discloses a device using a constant speed electric motor and a variable speed electric motor for speed change as electric devices and using a planetary gear transmission device as a transmission device, in order to accurately control a speed change ratio. In this device, the rotational speed of an output shaft of a transmission device connected to a rotary machine can be changed by changing the rotational speed of the variable speed electric motor.

CITATION LIST

Patent Literature

Patent Document 1: Japanese Patent No. 4472350

The above device can be a variable speed accelerator that accelerates a sun gear shaft serving as an output shaft by rotationally driving an internal gear of the planetary gear transmission device in a first direction using a driving force of the constant speed electric motor and rotationally driving a planetary gear carrier of the planetary gear transmission device in a second direction opposite to the first direction using the variable speed electric motor.

In the variable speed accelerator of such a configuration, in a case where a three-phase induction motor, for example, is used as a constant speed electric motor, the torque of the constant speed electric motor may exceed the rated torque immediately before the constant speed electric motor has reached the rated rotational speed at the starting of the variable speed accelerator.

Since the torque of the constant speed electric motor is transmitted to the internal gear, the planetary gear, and a rotor of the variable speed electric motor connected via the planetary gear carrier, it is necessary to enlarge the capacity of the variable speed electric motor in order to cope with this phenomenon.

However, the cost of the device rises by adopting a variable speed electric motor with large capacity and an inverter with large capacity, which are corresponding to a phenomenon in which the torque of the constant speed electric motor exceeds the rated torque.

SUMMARY OF INVENTION

One or more embodiments of the invention provide a starting method for a variable speed accelerator and a starting control device for a variable speed accelerator that can further reduce cost, in a variable speed accelerator including an electric device consisting of a constant speed electric motor and a variable speed electric motor, and a planetary gear transmission device that shifts a rotational drive force generated by the electric device to transmit the changed speed to an object to be driven.

According to an aspect of the invention, for example, there is provided a starting method for a variable speed accelerator including an electric device that generates a rotational drive force, and a transmission device that shifts the rotational drive force generated by the electric device to transmit the changed speed to an object to be driven. The transmission device has a sun gear that rotates about an axis, a sun gear shaft that is fixed to the sun gear and extends in an axial direction about the axis, a planetary gear that meshes with the sun gear, revolves around the axis, and rotates about its own center axis, an internal gear that has a plurality of teeth aligned annularly about the axis and meshes with the planetary gear, a planetary gear carrier that has a planetary gear carrier shaft extending in the axial direction about the axis and supports the planetary gear so as to be revolvable around the axis and so as to be rotatable about a center axis of the planetary gear itself, and an internal gear carrier that has an internal gear carrier shaft extending in the axial direction about the axis and supports the internal gear so as to be rotatable about the axis. The electric device has a constant speed electric motor that has a constant speed rotor that rotates the internal gear carrier shaft of the transmission device in a first direction, and a variable speed electric motor that has a variable speed rotor connected to the planetary gear carrier shaft of the transmission device, functions as a generator in a generator mode in which the variable speed rotor rotates in the first direction, and functions as an electric motor in an electric motor mode in which the variable speed rotor rotates in the second direction that is an opposite direction to the first direction. The starting method for a variable speed accelerator includes a variable speed electric motor start-up step in which the variable speed electric motor is started up at approximately a minimum rotational speed of the electric motor mode; a constant speed electric motor start-up step in which the constant speed electric motor is started up and the rotational speeds of the constant speed rotor and the internal gear in the first direction are gradually increased; a generator mode transition step in which the variable speed electric motor is made to transit to the generator mode when a current value of the variable speed electric motor has reached a predetermined current value; and an electric motor mode transition step in which the variable speed electric motor is made to transit to the electric motor mode when a current value of the constant speed electric motor becomes lower than a predetermined current value.

According to such a configuration of one or more embodiments, when the torque of the constant speed electric motor exceeds the rated torque, the rotational direction of the variable speed rotor of the variable speed electric motor is controlled, so that the torque of the variable speed electric motor can be prevented from exceeding the rated torque. Accordingly, it is unnecessary to enlarge the capacity of the variable speed electric motor, and the manufacturing cost of the variable speed accelerator can be reduced.

In the generator mode transition step, the variable speed electric motor may be made to transit to the generator mode when the current value of the variable speed electric motor has reached a rated current.

In the electric motor mode transition step, the variable speed electric motor may be made to transit to the electric motor mode when a rotational speed of the constant speed electric motor has reached a rated rotational speed.

According to another aspect of the invention, for example, there is provided a starting control device for a variable speed accelerator including an electric device that generates a rotational drive force, and a transmission device that shifts the rotational drive force generated by the electric device to transmit the changed speed to an object to be driven. The transmission device has a sun gear that rotates about an axis, a sun gear shaft that is fixed to the sun gear and extends in an axial direction about the axis, a planetary gear that meshes with the sun gear, revolves around the axis, and rotates about its own center axis, an internal gear that has a plurality of teeth aligned annularly about the axis and meshes with the planetary gear, a planetary gear carrier that has a planetary gear carrier shaft extending in the axial direction about the axis and supports the planetary gear so as to be revolvable around the axis and so as to be rotatable about a center axis of the planetary gear itself, and an internal gear carrier that has an internal gear carrier shaft extending in the axial direction about the axis and supports the internal gear so as to be rotatable about the axis. The electric device has a constant speed electric motor that has a constant speed rotor that rotates the internal gear carrier shaft of the transmission device in a first direction, and a variable speed electric motor that has a variable speed rotor connected to the planetary gear carrier shaft of the transmission device, functions as a generator in a generator mode in which the variable speed rotor rotates in the first direction, and functions as an electric motor in an electric motor mode in which the variable speed rotor rotates in the second direction that is an opposite direction to the first direction. The starting control device for the variable speed accelerator includes a frequency converting device that changes a frequency of electric power to be supplied to the variable speed electric motor; a first switch that brings the variable speed electric motor into an electric power supply state and electric power cutoff state; a second switch that brings the constant speed electric motor into an electric power supply state and an electric power cutoff state; a first current value measuring device that measures a current value of the variable speed electric motor; a second current value measuring device that measures a current value of the constant speed electric motor; and a control unit ("controller") that instructs the frequency converting device regarding a frequency of electric power to be supplied to the variable speed electric motor and instructs the first switch and the second switch to be turned on and off. The control unit instructs the first switch to be turned on so as to bring the variable speed electric motor into the electric power supply state if an instruction for starting is received, and instructs the second switch to be turned on so as to bring the constant speed electric motor into the electric power supply state after the frequency converting device is instructed on a predetermined minimum frequency and the variable speed electric motor begins to be driven at a minimum rotational speed in the electric motor mode. The variable speed electric motor is made to transit to the generator mode when the current value of the variable speed electric motor has reached a predetermined current value. The variable speed electric motor is made to transit to the electric motor mode when the current value of the constant speed electric motor becomes lower than a predetermined current value.

In the starting control device for a variable speed accelerator, the control unit may calculate a frequency by taking a slip of the variable speed electric motor and control delay into consideration when the variable speed electric motor is made to transit to the generator mode.

According to such a configuration of one or more embodiments, when the torque of the constant speed electric motor exceeds the rated torque, the rotational direction of the variable speed rotor of the variable speed electric motor is controlled, so that the torque of the variable speed electric motor can be prevented from exceeding the rated torque. Accordingly, it is unnecessary to enlarge the capacity of the variable speed electric motor, and the manufacturing cost of the variable speed accelerator can be reduced.

DETAILED DESCRIPTION OF EMBODIMENTS

Figure 1:
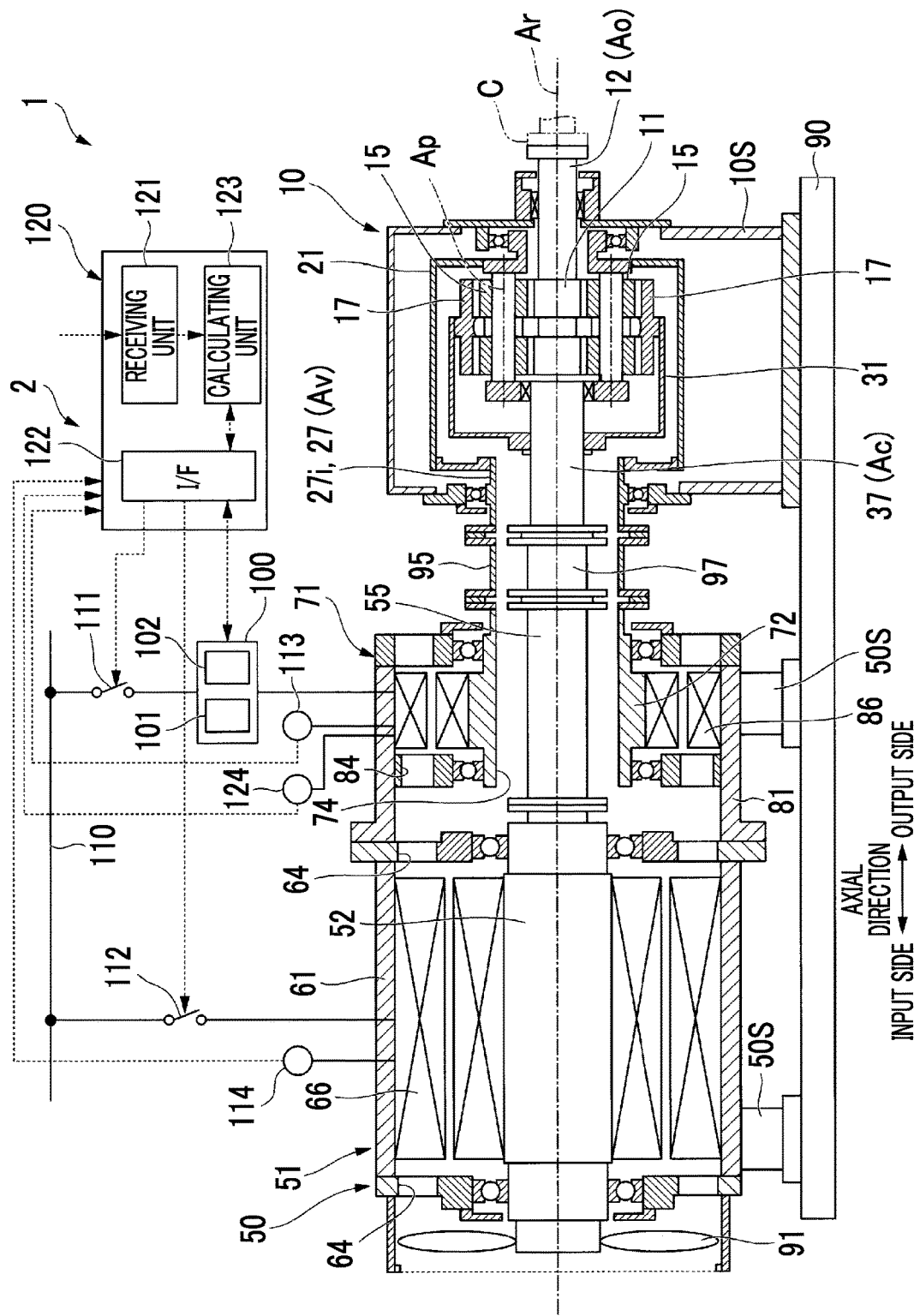
FIG. 1 is a sectional view of a variable speed accelerator of one or more embodiments of the invention.

Hereinafter, a variable speed accelerator having a starting control device for a variable speed accelerator of one or more embodiments of the invention will be described in detail, referring to the drawings.

As illustrated in FIG. 1, a variable speed accelerator 1 of one or more embodiments includes an electric device 50 that generates a rotational drive force, and a transmission device that shifts the rotational drive force generated by the electric device 50 to transmit the changed speed to an object to be driven. The variable speed accelerator 1 is applicable to, for example, fluid machine systems, such as a compressor system.

The electric device 50 has a constant speed electric motor 51 that rotationally drives an internal gear carrier shaft 37 serving as a constant speed input shaft Ac at a constant speed, and a variable speed electric motor 71 that rotationally drives an input-side planetary gear carrier shaft 27i serving as a variable speed input shaft Av at an arbitrary rotational speed. The variable speed accelerator 1 is capable of changing the rotational speed of an output shaft Ao of the transmission device 10 connected to the object to be driven by changing the rotational speed of the variable speed electric motor 71.

The electric device 50 is supported on a mount 90 by an electric device support part 50S. The transmission device 10 is supported on the mount 90 by a transmission device support part 10S. These support parts enable the electric device 50 and the transmission device 10, which are heavy objects, to be reliably fixed.

Figure 2:
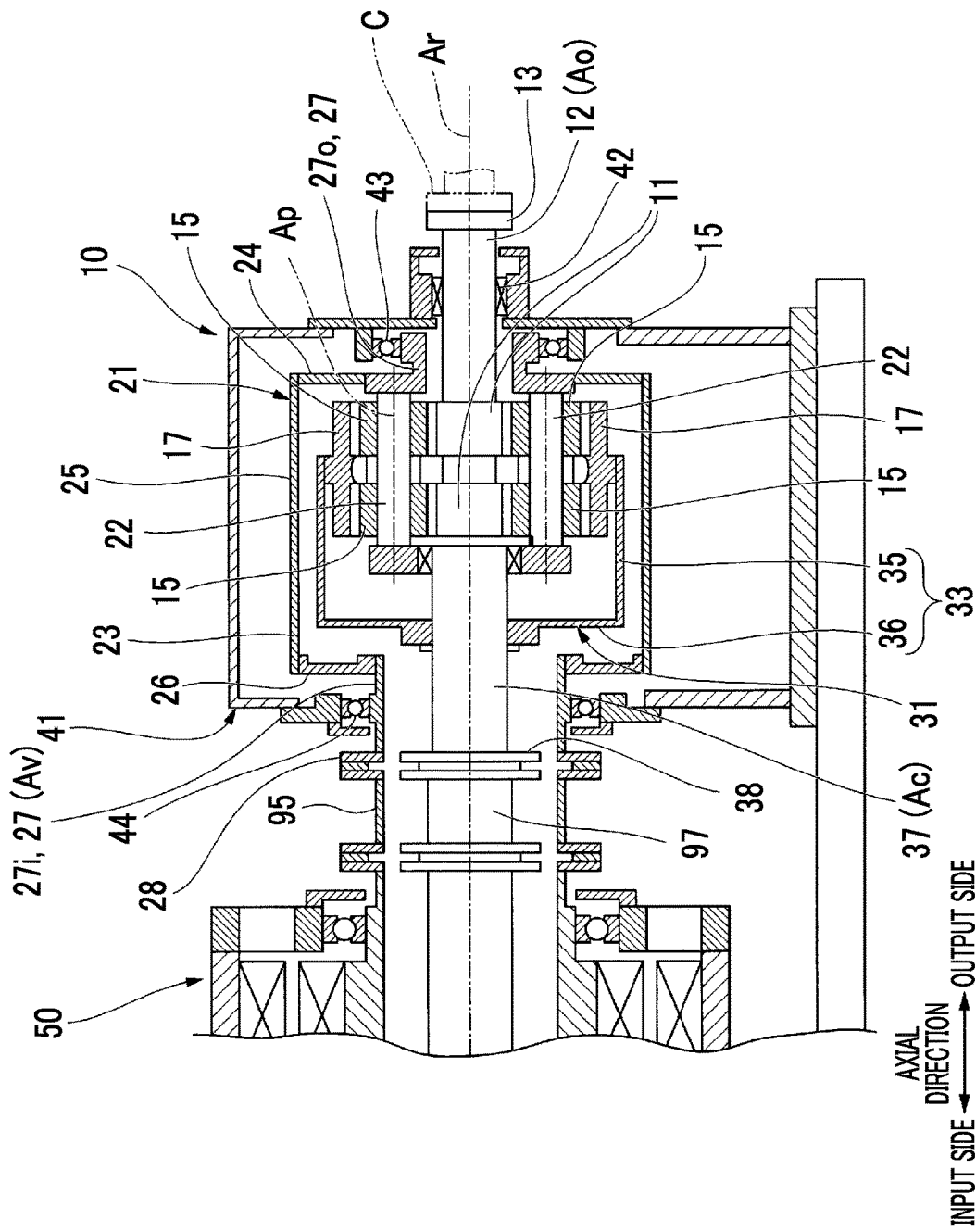
FIG. 2 is a sectional view of a transmission device of one or more embodiments of the invention.

The transmission device 10 is a planetary gear transmission device. As illustrated in FIG. 2, the transmission device 10 has a sun gear 11 that rotates about an axis Ar extending in a horizontal direction, a sun gear shaft 12 that is fixed to the sun gear 11, a plurality of planetary gears 15 that mesh with the sun gear 11, revolve around the axis Ar, and rotate about their own center axes Ap, an internal gear 17 that has a plurality of teeth aligned annularly about the axis Ar and meshes with the plurality of planetary gears 15, a planetary gear carrier 21 that supports a plurality of planetary gears 15 so as to be revolvable around the axis Ar and so as to be rotatable about the center axes Ap of the planetary gears 15 themselves, an internal gear carrier 31 that supports the internal gear 17 so as to be rotatable about the axis Ar, and a transmission casing 41 that covers these.

Here, a direction in which the axis Ar extends is defined as an axial direction, one side in the axial direction is defined as an output side, and a side opposite to the output side is defined as an input side. Additionally, hereinafter, the radial direction centered on the axis Ar is simply referred to as the radial direction.

The sun gear shaft 12 forms a columnar shape about the axis Ar, and extends from the sun gear 11 to an output side in the axial direction. A flange 13 is formed at an output-side end part of the sun gear shaft 12. For example, a rotor of a compressor C serving as the object to be driven is connected to the flange 13. The sun gear shaft 12 is supported so as to be rotatable about the axis Ar by a sun gear bearing 42 disposed on the output side of the sun gear 11. The sun gear bearing 42 is attached to the transmission casing 41.

The planetary gear carrier 21 has a planetary gear shaft 22 provided for each of the plurality of planetary gears 15, a carrier body 23 that fixes the mutual positions of the plurality of planetary gear shaft 22, and a planetary gear carrier shaft 27 that is fixed to the carrier body 23 and extend in the axial direction about the axis Ar.

The planetary gear shaft 22 passes through the center axis Ap of each planetary gear 15 in the axial direction, and supports the planetary gear 15 so as to be rotatable about its center axis. The carrier body 23 has an output-side arm part extends radially outward from the plurality of planetary gear shafts 22, a cylindrical portion 25 that forms a cylindrical shape about the axis Ar and extends from a radial outer end of the output-side arm part 24 to an input side, and an input-side arm part 26 that extends radially inward from an output-side end of the cylindrical portion 25.

The planetary gear carrier shaft 27 has an output-side planetary gear carrier shaft 27o that extends from the output-side arm part 24 to the output side, and an input-side planetary gear carrier shaft 27i that extends from the input-side arm part 26 to the input side. Both of the output-side planetary gear carrier shaft 27o and the input-side planetary gear carrier shaft 27i form a cylindrical shape about the axis Ar.

The output-side planetary gear carrier shaft 27o is supported so as to be rotatable about the axis Ar by a planetary gear carrier bearing 43 disposed closer to the output side than the output-side arm part 24. The planetary gear carrier bearing 43 is attached to the transmission casing 41. The sun gear shaft 12 is inserted through an inner peripheral side of the output-side planetary gear carrier shaft 27o.

The input-side planetary gear carrier shaft 27i is supported so as to be rotatable about the axis Ar by a planetary gear carrier bearing 44 disposed closer to the input side than the input-side arm part 26. The planetary gear carrier bearing 44 is attached to the transmission casing 41. An annular flange 28 that spreads radially outward is formed at an input-side end of the input-side planetary gear carrier shaft 27i.

The internal gear carrier 31 has a carrier body 33 to which that the internal gear 17 is fixed, and an internal gear carrier shaft 37 that is fixed to the carrier body 33 and extends in the axial direction about the axis Ar.

The carrier body 33 forms a cylindrical shape about the axis Ar, and has a cylindrical portion 35 that has the internal gear 17 fixed to an inner peripheral side thereof, and an input-side arm part 36 that extends radially inward from an input-side end of the cylindrical portion 35.

The internal gear carrier shaft 37 forms a columnar shape about the axis Ar, and is disposed on the input side of the sun gear shaft 12 that similarly forms a columnar shape about the axis Ar. The input-side arm part 36 of the carrier body 33 is fixed to the internal gear carrier shaft 37. An annular or disk-shaped flange 38 that spreads radially outward is formed at an input-side end of the internal gear carrier shaft 37. An input-side portion of the internal gear carrier shaft 37 is inserted through an inner peripheral side of the cylindrical input-side planetary gear carrier shaft 27i. The position of the flange 38 of the internal gear carrier shaft 37 and the flange 28 of the input-side planetary gear carrier shaft 27i substantially coincide with each other in the axial direction.

Figure 3:
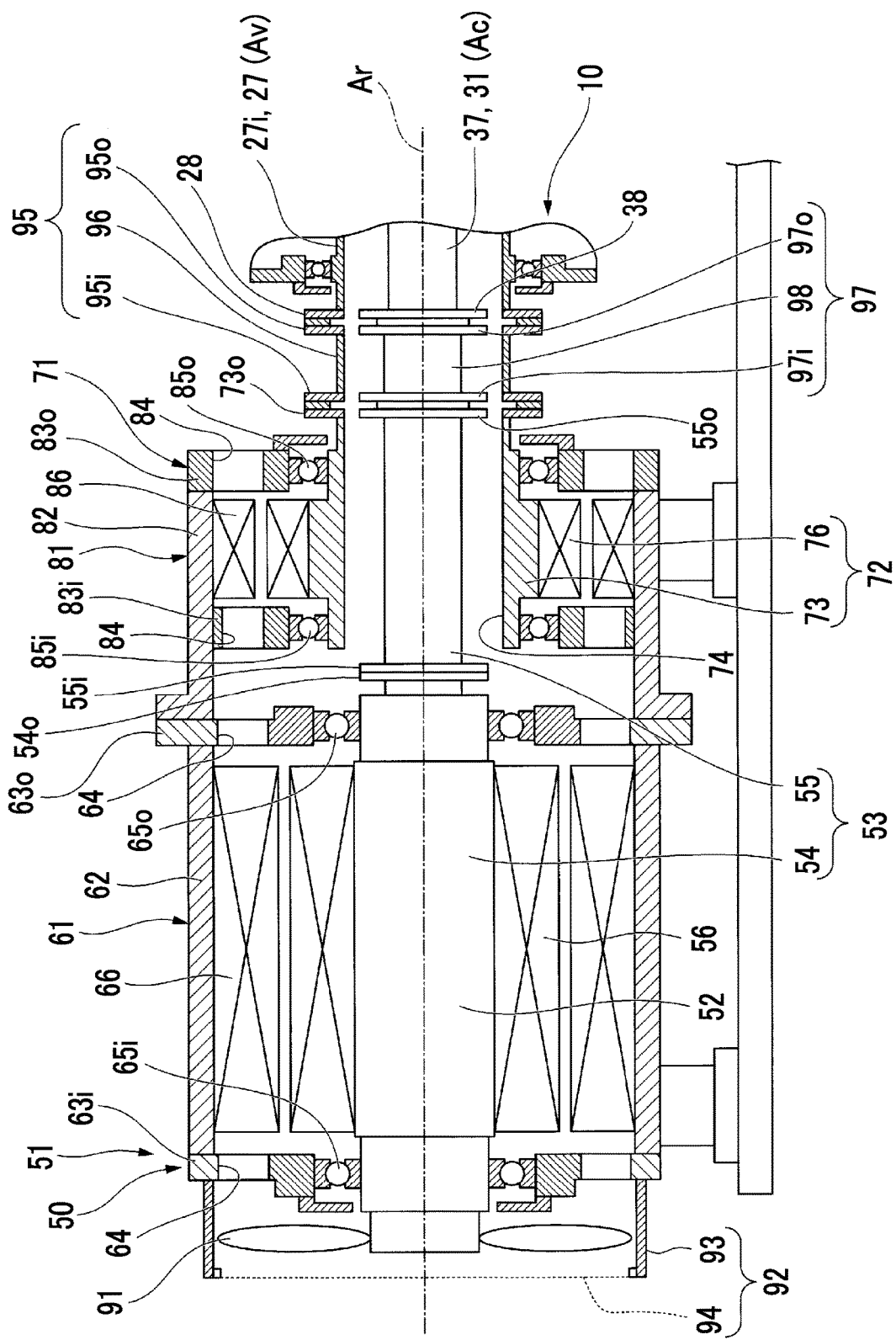
FIG. 3 is a sectional view of an electric device of one or more embodiments of the invention.

As illustrated in FIG. 3, the constant speed electric motor 51 rotationally drives the internal gear carrier shaft 37 of the transmission device 10 via a constant speed rotor extension shaft 55. The variable speed electric motor 71 rotationally drives the input-side planetary gear carrier shaft 27i of the transmission device 10. The electric device 50 has a cooling fan 91 for cooling the constant speed electric motor 51 and the variable speed electric motor 71, and a fan cover 92 that covers this cooling fan 91.

In one or more embodiments, the constant speed electric motor 51 is, for example, a three-phase four-pole induction motor. Additionally, the variable speed electric motor 71 is a six-pole induction motor with more poles than the constant speed electric motor 51. In addition, the specifications of the constant speed electric motor 51 and the variable speed electric motor 71 are not limited to this, and the specifications can be appropriately changed.

The constant speed electric motor 51 has a constant speed rotor 52 that rotates about the axis Ar and is connected to the internal gear carrier shaft 37 that is the constant speed input shaft Ac of the transmission device 10, and a constant speed stator 66 that is disposed on an outer peripheral side of the constant speed rotor 52, and a constant speed electric motor casing 61 that has the constant speed stator 66 fixed to an inner peripheral side thereof. The constant speed electric motor 51 rotationally drives the constant speed rotor 52 in a first direction (normal direction) of a circumferential direction of the axis Ar. As the constant speed rotor 52 rotates in the first direction, the internal gear carrier shaft and the internal gear carrier 31 rotate in the first direction.

The constant speed rotor 52 has a constant speed rotor shaft 53, and a conductor 56 that is fixed to an outer periphery of the constant speed rotor shaft 53. Additionally, the constant speed rotor shaft 53 forms a columnar shape about the axis Ar, and has a constant speed rotor body shaft 54 that has the conductor 56 fixed to an outer periphery thereof, and the constant speed rotor extension shaft 55 that forms a columnar shape about the axis Ar and is fixed to an output side of the constant speed rotor body shaft 54. Annular or disk-shaped flanges 55i and 55o that spread radially outward are formed at both ends of the constant speed rotor extension shaft 55 in the axial direction, respectively. An annular or disk-shaped flange 54o that spreads radially outward is formed at an output-side end of the constant speed rotor body shaft 54. The constant speed rotor extension shaft 55 and the constant speed rotor body shaft 54 are integrated with each other by the respective flanges 55i, 55o, and 54o being connected together with bolts or the like. The cooling fan 91 is fixed to an input-side end of the constant speed rotor body shaft 54.

The constant speed stator 66 is disposed radially outside the conductor 56 of the constant speed rotor 52. The constant speed stator 66 is formed with a plurality of coils.

The constant speed electric motor casing 61 forms a cylindrical shape about the axis Ar, and has a casing body 62 that has the constant speed stator 66 fixed to an inner peripheral side thereof, and lids 63i and 63o that cover both ends of the cylindrical casing body 62 in the axial direction. Constant speed rotor bearings 65i and 65o that support the constant speed rotor body shaft 54 so as to be rotatable about the axis Ar are attached to the lids 63i and 63o, respectively. Additionally, a plurality of openings 64 penetrating in the axial direction are formed in each of the lids 63i and 63o at positions radially outward of the constant speed rotor bearings 65i and 65o.

An input-side end of the constant speed rotor body shaft 54 protrudes from the input-side lid 63i of the constant speed electric motor casing 61 to the input side. The aforementioned cooling fan 91 is fixed to an input-side end of the constant speed rotor body shaft 54. For this reason, if the constant speed rotor 52 rotates, the cooling fan 91 rotates integrally with the constant speed rotor 52. The fan cover 92 has a cylindrical cover body 93 that is disposed on an outer peripheral side of the cooling fan 91, and an air flow plate 94 that is attached to an inlet-side opening of the cover body 93 and has a plurality of air holes formed therein. The fan cover is fixed to the input-side lid 63i of the constant speed electric motor casing 61.

The variable speed electric motor 71 has a variable speed rotor 72 that rotates about the axis Ar and is connected to the input-side planetary gear carrier shaft 27i that is the variable speed input shaft Av, a variable speed stator 86 that is disposed on an outer peripheral side of the variable speed rotor 72, and a variable speed electric motor casing 81 that has the variable speed stator 86 fixed to an inner peripheral side thereof.

The variable speed electric motor 71 is capable of rotationally driving the variable speed rotor 72 in the first direction of the circumferential direction of the axis Ar and a second direction that is a direction opposite to the first direction. Namely, a normal rotation and a reverse rotation are possible for the variable speed electric motor 71.

The variable speed electric motor 71 functions as a generator by rotating the variable speed rotor 72 in the first direction. A state where the variable speed electric motor 71 functions as a generator is referred to as a generator mode. Namely, the variable speed rotor 72 of the variable speed electric motor 71 rotates in the first direction in the generator mode.

The variable speed electric motor 71 functions as an electric motor by rotating the variable speed rotor 72 in the second direction opposite to the first direction. A state where the variable speed electric motor 71 functions as an electric motor is referred to as an electric motor mode. Namely, the variable speed rotor 72 of the variable speed electric motor 71 rotates in the second direction in the electric motor mode.

As the variable speed rotor 72 rotates in the first direction, the planetary gear carrier shaft 27 and the planetary gear carrier 21 rotate in the first direction.

The variable speed electric motor 71 of one or more embodiments is a six-pole phase induction motor, and cannot control its rotational speed near 0 rpm. In the variable speed electric motor 71 of one or more embodiments, for example, a range of −90 to 90 rpm that is 10% or less of a rated rotational speed is an uncontrollable range where the rotational speed is uncontrollable. Namely, a minimum rotational speed of the variable speed electric motor 71 of one or more embodiments is 90 rpm. The electric power to be supplied to the variable speed electric motor 71 at the minimum rotational speed of 90 rpm is 5 Hz that is 10% of a power frequency (50 Hz).

The variable speed rotor 72 has a variable speed rotor shaft 73, and a conductor 76 that is fixed to an outer periphery of the variable speed rotor shaft 73. The variable speed rotor shaft 73 forms a cylindrical shape about the axis Ar, and has a shaft insertion hole 74 penetrating in the axial direction formed therein. The constant speed rotor extension shaft 55 is inserted through the shaft insertion hole 74 of the variable speed rotor shaft 73. An annular flange 73o that spreads radially outward is formed at an output-side end of the variable speed rotor shaft 73. The positions of the flange 73o of the variable speed rotor shaft 73 and the flange 55o formed at an output-side end of the constant speed rotor extension shaft 55 in the axial direction substantially coincide with each other.

The variable speed stator 86 is disposed radially outside the conductors 56 and 76 of the variable speed rotor 72. The variable speed stator 86 is formed with a plurality of coils.

The variable speed electric motor casing 81 has a casing body 82 that forms a cylindrical shape about the axis Ar and has the variable speed stator 86 fixed to an inner peripheral side thereof, an output-side lid 83o that covers an output-side end of the cylindrical casing body 82, and an inlet-side lid 83i that is disposed closer to the input side than the variable speed stator 86 and is fixed to an inner peripheral side of the cylindrical casing body 82. Variable speed rotor bearings 85i and 85o that support the variable speed rotor shaft 73 so as to be rotatable about the axis Ar are attached to the lids 83i and 83o, respectively. Additionally, a plurality of openings 84 penetrating in the axial direction are formed in each of the lids 83i and 83o at positions radially outward of the variable speed rotor bearings 85i and 85o.

As described above, the plurality of openings 84 formed in each of the lids 83i and 83o of the variable speed electric motor casing 81 and the plurality of openings 64 formed in each of the lids 63i and 63o of the constant speed electric motor casing 61 allow a space within the variable speed electric motor casing 81 and a space within the constant speed electric motor casing 61 to communicate with each other.

Additionally, in the variable speed accelerator 1 of one or more embodiments, the constant speed rotor 52, the variable speed rotor 72, and the sun gear shaft 12 are disposed on the same axis.

The variable speed accelerator 1 of one or more embodiments further includes a variable-speed flexible coupling that is disposed between the input-side planetary gear carrier shaft 27i, which is the variable speed input shaft Av, and the variable speed rotor 72 to connect both together, and a constant-speed flexible coupling 97 that is disposed between the internal gear carrier shaft 37, which is the constant speed input shaft Ac, and the constant speed rotor 52 to connect both together.

The variable speed accelerator 1 of one or more embodiments includes a starting control device 2 for a variable speed accelerator that performs particularly control of the variable speed electric motor 71 when the variable speed accelerator is started. The starting control device 2 for a variable speed accelerator includes a rotational speed control device 100 that controls the rotational speed of the variable speed electric motor 71, a first switch 111 that brings the variable speed electric motor 71 into an electric power supply state and an electric power cutoff state, a second switch 112 that brings the constant speed electric motor 51 into an electric power supply state and an electric power cutoff state, a first current value measuring device 113 that measures the current value of the variable speed electric motor 71, a second current value measuring device 114 that measures the current value of the constant speed electric motor 51, and a control unit 120 that controls the operation of the rotational speed control device 100, the first switch 111, and the second switch 112.

The control unit 120 is constituted by a computer. The control unit 120 includes a receiving unit 121 that directly receives an instruction from an operator or receives an instruction from a host control device, an interface 122 that gives instructions to the first switch 111, the rotational speed control device 100, and the second switch 112, and a calculating unit 123 that creates instructions for the first switch 111, the second switch 112, and the rotational speed control device 100 in accordance with the instruction received by the receiving unit 121.

The first switch 111 is electrically connected to a power source line 110 and the rotational speed control device 100. The rotational speed control device 100 is electrically connected to the variable speed electric motor 71. A second switch 112 is electrically connected to the power source line 110 and the constant speed electric motor 51.

The first switch 111 is turned on in response to an ON instruction from the control unit 120, and is turned off in response to an OFF instruction from the control unit 120. If the first switch 111 is turned on, the electric power from the power source line 110 is supplied to the variable speed electric motor 71 via the rotational speed control device 100, and the variable speed electric motor 71 is brought into the electric power supply state. If the first switch 111 is turned off, the supply of electric power from the power source line 110 to the rotational speed control device 100 and the variable speed electric motor 71 is cut off, and the variable speed electric motor 71 is brought into the electric power cutoff state.

The second switch 112 is turned on in response to an ON instruction from the control unit 120, and is turned off in response to an OFF instruction from the control unit 120. If the second switch 112 is turned on, the electric power from the power source line 110 is supplied to the constant speed electric motor 51, and the constant speed electric motor 51 is brought into the electric power supply state. If the second switch 112 is turned off, the supply of electric power from the power source line 110 to the constant speed electric motor 51 is cut off, and the constant speed electric motor 51 is brought into the electric power cutoff state.

The rotational speed control device 100 includes a frequency conversion unit 101 that changes the frequency of the electric power supplied from the power source line 110, and a rotational direction changing unit 102 that changes the rotational direction of the variable speed electric motor 71.

The frequency conversion unit 101 supplies the electric power of a frequency about which an instruction is given from the control unit 120 to the variable speed electric motor 71. The variable speed rotor 72 of the variable speed electric motor 71 rotates at a rotational speed according to this frequency. In this way, since the rotational speed of the variable speed rotor 72 varies, the rotational speed of the planetary gear carrier 21 of the transmission device 10 connected to the variable speed rotor 72 also varies. As a result, the rotational speed of the sun gear shaft 12 that is the output shaft Ao of the transmission device 10 also varies.

The rotational direction changing unit 102 is a device that changes the rotational direction of the variable speed electric motor 71 by using a circuit to that switches a plurality of power source lines (three in one or more embodiments) connected to the variable speed electric motor 71. Namely, the rotational direction changing unit 102 can normally rotate and reversely rotate the variable speed rotor 72.

Figure 4:
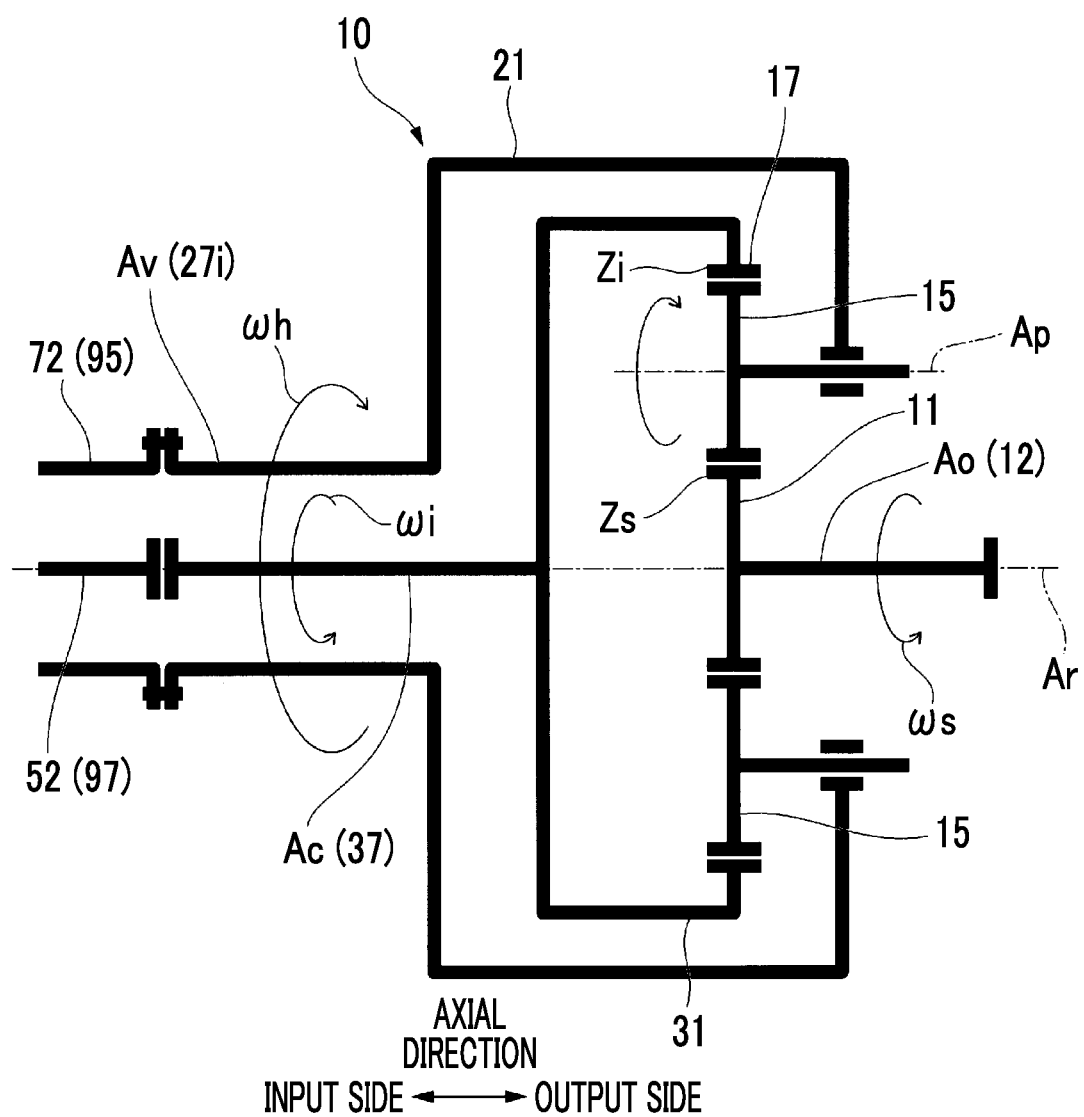
FIG. 4 is a schematic view illustrating the configuration of the transmission device of one or more embodiments of the invention.

Here, a relationship between the number of teeth of each gear of the transmission device 10 and the rotational speed of each shaft of the transmission device 10 will be described with reference to FIG. 4.

The rotational speed of the sun gear shaft 12 serving as the output shaft Ao is defined as $\omega s$, the rotational speed of the internal gear carrier shaft 37 serving as the constant speed input shaft Ac is defined as $\omega i$, and the rotational speed of the input-side planetary gear carrier shaft 27i serving as the variable speed input shaft Av is defined as $\omega h$. Additionally, the number of teeth of the internal gear 17 is defined as Zs, and the number of teeth of the sun gear 11 is defined as Zi.

In one or more embodiments, a relationship between the number of teeth of each gear and the rotational speed of each shaft of the transmission device 10 can be expressed by the following Equation (1).

$$\omega s/\omega i = \omega h/\omega i - (1 - \omega h/\omega i) \times Zi/Zs \qquad (1)$$

If the constant speed electric motor 51 is a four-pole induction motor and the power frequency is 50 Hz, the rotational speed $\omega i$ (rated rotational speed) of the constant speed rotor 52 (constant speed input shaft Ac) is 1500 rpm. Additionally, if the variable speed electric motor 71 is a six-pole induction motor and the power frequency is 50 Hz, the maximum rotational speed $\omega h$ (rated rotational speed) of the variable speed rotor 72 (variable speed input shaft Av) is 900 rpm. Additionally, a ratio Zi/Zs of the number Zs of teeth of the sun gear 11 and the number Zi of teeth of the internal gear 17 is four.

In one or more embodiments, if the direction of rotation of the constant speed rotor 52 (internal gear 17) is defined as the normal rotation (rotation in the first direction), and the variable speed rotor 72 (planetary gear carrier 21) rotates at a maximum rotational speed (−900 rpm) in the reverse direction (rotation in the second direction) from the rotation of the constant speed rotor 52, the rotational speed $\omega s$ of the sun gear shaft 12 that is the output shaft Ao is −10500 rpm. This rotational speed (−10500 rpm) is a maximum rotational speed of the sun gear shaft 12.

Namely, in the transmission device 10 of one or more embodiments, the rotational speed ωs of the output shaft Ao is a maximum rotational speed by normally rotating the internal gear 17 corresponding to the constant speed input shaft Ac at +1500 rpm and reversely rotating the planetary gear carrier 21 corresponding to the variable speed input shaft Av at −900 rpm.

Assuming that the variable speed range of the variable speed input shaft Av is −900 rpm to +900 rpm, the rotational speed ωs of the output shaft Ao becomes low as the rotational speed of the variable speed input shaft Av approach+900 rpm.

In one or more embodiments, if the direction of rotation of the constant speed rotor 52 is defined as the normal rotation, and the variable speed rotor 72 rotates at a minimum rotational speed (−90 rpm) in the reverse direction from the rotation of the constant speed rotor 52, the rotational speed of the sun gear shaft 12 is −6450 rpm.

If the rotational speed (rated rotational speed) of the constant speed rotor 52 is +1500 rpm and the rotational speed of the variable speed rotor 72 in the electric motor mode is controlled in a range of −300 to −900 rpm in a frequency control using the frequency conversion unit 101, in other words, if the frequency of the electric power to be supplied to the variable speed electric motor 71 is controlled in a range of 16.7 Hz to 50 Hz, the rotational speed of the sun gear shaft 12 that is the output shaft Ao can be controlled in a range of −7500 to −10500 rpm. This range is the variable speed range of the sun gear shaft 12 that is the output shaft Ao of the variable speed accelerator 1, and the variable speed accelerator 1 usually rotates the output shaft Ao in this variable speed range.

Here, the characteristics of the constant speed electric motor 51 of one or more embodiments will be described. FIG. 6(a) is a graph illustrating a relationship between time and torque T2 after the starting of the constant speed electric motor 51 (CM), and FIG. 6(b) is a graph illustrating a relationship between time and rotational speed S2.

The constant speed electric motor 51 is a three-phase four-pole induction motor, and if the constant speed electric motor 51 is started and is brought into the electric power supply state, as illustrated in FIG. 6(b), the rotational speed S2 of the constant speed electric motor 51 rises gradually. The time and the rotational speed S2 after the starting are approximately proportional to each other.

The torque T2 of the constant speed electric motor 51 becomes large while drawing a curve as illustrated in FIG. 6(a). As illustrated in FIG. 6(a), the torque T2 of the constant speed electric motor 51 is not proportional to the rotational speed S2 of the constant speed electric motor 51 and rises sharply as the rotational speed S2 approaches the rated rotational speed (100%, 1500 rpm).

There is a case where the torque T2 of the constant speed electric motor 51 may exceed a rated torque (100%) before (time t2) the rotational speed S2 of the constant speed electric motor 51 reaches the rated rotational speed.

Specifically, the torque T2 that has become larger than the rated torque becomes small while the rotational speed S2 of the constant speed electric motor 51 reaches the rated rotational speed, and gradually returns to the rated torque if the rotational speed S2 of the constant speed electric motor 51 reaches the rated rotational speed. Specifically, the torque T2 of the constant speed electric motor 51, for example, rises up to 130% of the rated torque before the rotational speed S2 of the constant speed electric motor 51 reaches the rated rotational speed, and, for example, falls down to 50% of the rated torque and then gradually rises up to the rated torque at a time (time t3) when the rotational speed S2 of the constant speed electric motor 51 reaches the rated rotational speed.

Namely, there is a case where the torque T2 of the constant speed electric motor 51 may exceed the rated torque in a process in which the rotational speed S2 is gradually increased after the starting.

Figure 5:
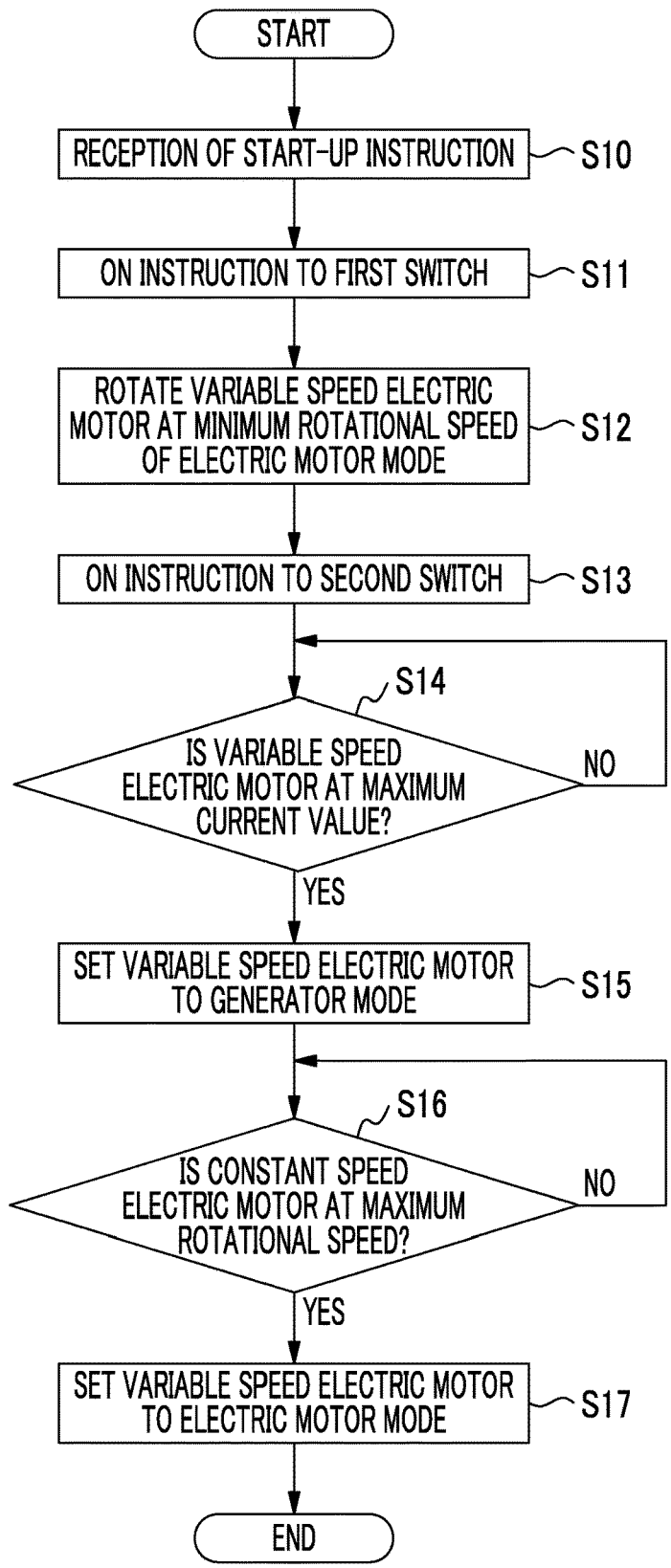
FIG. 5 is a flowchart illustrating the operation of a control device of one or more embodiments of the invention.
Figure 6:
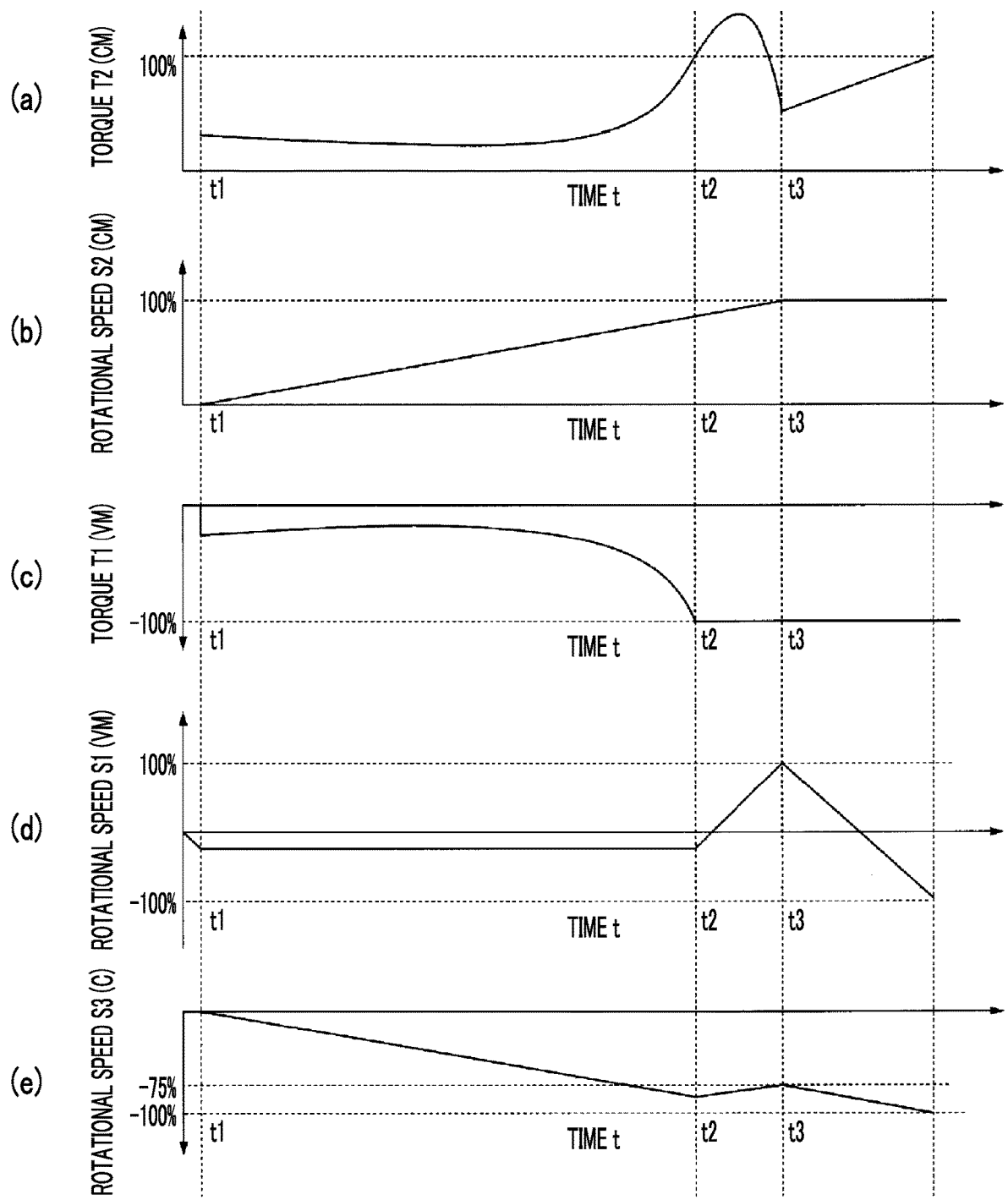
FIGS. 6($a$)-($e$) are graphs illustrating the rotational speed and torque of a constant speed electric motor, the rotational speed and torque of a variable speed electric motor, and the rotational speed of a sun gear shaft in one or more embodiments of the invention.

Next, a starting method for the variable speed accelerator 1 of one or more embodiments will be described in accordance with the flowchart illustrated in FIG. 5 and the graph illustrated in FIG. 6.

FIG. 6(c) is a graph illustrating a relationship between time and torque T1 after the starting of the variable speed electric motor 71 (VM), and FIG. 6(d) is a graph illustrating a relationship between time and rotational speed S1 after the starting of the variable speed electric motor 71. FIG. 6(e) is a graph illustrating a relationship between time and the rotational speed S3 of the sun gear shaft 12 to which that a rotor of the compressor C is connected.

(Variable Speed Electric Motor Start-Up Step)

First, a variable speed electric motor start-up step in which the variable speed electric motor 71 is started up at approximately the minimum rotational speed in the electric motor mode will be described.

In the starting method for the variable speed accelerator 1, if the control unit 120 receives a starting instruction for the variable speed accelerator 1 from the outside (S10), an ON instruction is output to the first switch 111 (S11), and the variable speed electric motor 71 is rotated at approximately the minimum rotational speed of the electric motor mode (S12). Here, the minimum rotational speed is a rotational speed when the frequency to be input to the variable speed electric motor is a minimum frequency capable of being set by the rotational speed control device 100 or a minimum frequency set in advance by an operator.

If the first switch 111 is turned on, the electric power from the power source line 110 is supplied to the frequency conversion unit 101. Additionally, if the minimum frequency is received as an instruction value of a frequency from the control unit 120, the frequency conversion unit 101 converts the frequency of the electric power from the power source line 110 into the minimum frequency, and supplies the converted frequency to the variable speed electric motor 71. As a result, the variable speed electric motor 71 is brought into the electric power supply state where the electric power of the minimum frequency is supplied. In a case where the variable speed electric motor 71 of one or more embodiments receives the electric power of the same frequency (the maximum frequency: 50 Hz) as the power frequency, the rotational speed is 900 rpm of the maximum rotational speed as mentioned above. For this reason, in a case where the electric power of the minimum frequency (5 Hz) that is 1/10 of the power frequency is received, the rotational speed of the variable speed electric motor 71 is 90 rpm of the minimum rotational speed as mentioned above.

Additionally, the control unit 120 outputs an instruction to the rotational direction changing unit 102 such that the variable speed electric motor 71 is started in the electric motor mode. Namely, the direction of rotation of the variable speed electric motor 71 is the reverse direction (second direction) from the direction (first direction) of rotation of the constant speed electric motor 51. For this reason, the rotational speed of the variable speed electric motor 71 is −90 rpm if the direction of rotation of the constant speed electric motor 51 is the normal rotation.

Figure 7:
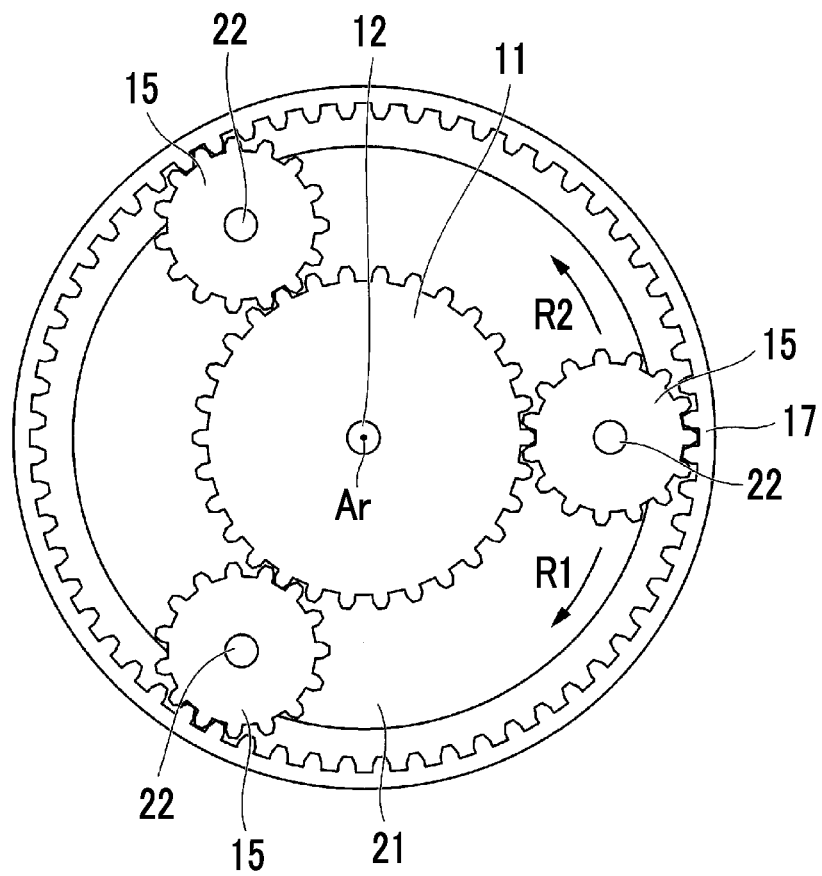
FIG. 7 is a schematic view for explaining a rotational direction of a gear that constitutes the transmission device of one or more embodiments of the invention.

As illustrated in FIG. 7, as the variable speed electric motor 71 rotates in the electric motor mode, the planetary gear carrier 21 that supports the planetary gears 15 rotates in the second direction R2. Along with this, the planetary gears 15 revolve around the axis Ar and rotate about their own center axes, and the sun gear 11 begins to rotate.

(Constant Speed Electric Motor Start-Up Step)

Next, a constant speed electric motor start-up step in which the constant speed electric motor 51 is started up and the rotational speeds of the constant speed rotor 52 and the internal gear 17 in the first direction are gradually increased will be described.

The control unit 120 outputs an ON instruction to the second switch 112 if the variable speed rotor 72 of the variable speed electric motor 71 begins to rotate and the sun gear shaft 12 that is the output shaft begins to rotate (S13, time t1).

If the second switch 112 is turned on, the electric power from the power source line 110 is supplied to the constant speed electric motor 51, and the constant speed electric motor is brought into the electric power supply state. If the constant speed electric motor 51 receives the electric power from the power source line 110, as illustrated in FIG. 6(b), the rotational speed S2 of the constant speed electric motor 51 rises gradually. Accordingly, the rotational speed of the internal gear 17 of the transmission device 10 also rises.

As illustrated in FIG. 7, the internal gear 17 is rotated in the first direction R1 by the rotation of the constant speed electric motor 51. Namely, the internal gear 17 and the planetary gear carrier 21 rotate in the reverse direction.

On the other hand, by transmitting the torque of the constant speed electric motor 51 to the variable speed rotor 72 of the variable speed electric motor 71 via the planetary gears that meshes with the internal gear 17, and the planetary gear carrier 21 that supports the planetary gears 15, the torque T1 of the variable speed electric motor 71 fluctuates as illustrated in FIG. 6(c).

Namely, as the planetary gear carrier 21 that rotates in the second direction R2 with respect to the internal gear 17 that rotates in the first direction R1 withstands the torque of the constant speed electric motor 51, torque is generated in the variable speed electric motor 71.

As illustrated in FIG. 6(c), the absolute value of the torque T1 of the variable speed electric motor 71 becomes large with a rise in the torque T2 (FIG. 6(a)) of the constant speed electric motor 51.

As illustrated in FIG. 6(e), the rotational speed S3 of the sun gear shaft 12 rises in accordance with the rotational speed S2 of the constant speed electric motor 51.

(Generator Mode Transition Step)

Next, a generator mode transition step in which the variable speed electric motor 71 in the electric motor mode is made to transit to the generator mode will be described. The control unit 120 determines whether or not the current value of the variable speed electric motor 71 has reached a maximum current value corresponding to the rated torque (−100%, FIG. 6(c)) of the variable speed electric motor 71 on the basis of the current value measured by the first current value measuring device 113 (S14). In a case where the current value of the variable speed electric motor 71 has reached the maximum current value, the variable speed electric motor 71 is set to the generator mode (S15, time t2).

Here, since the torque T1 of the variable speed electric motor 71 and the current value of the variable speed electric motor 71 are in a proportional relation, the control unit 120 can determine whether or not the torque T2 of the variable speed electric motor 71 has reached the rated torque by referring to the current value of the variable speed electric motor 71. The control unit 120 stores a current value (maximum current value) corresponding to a maximum torque in advance, and determines whether or not the variable speed electric motor 71 has reached the maximum current value.

As the variable speed electric motor 71 transits to the generator mode, the variable speed rotor 72 of the variable speed electric motor 71 rotates in the same direction (first direction) as the constant speed rotor 52 of the constant speed electric motor 51. The control unit 120 gives an instruction such that the rotational speed of the variable speed electric motor 71 is maximum rotational speed (900 rpm) in the first direction.

Accordingly, in one or more embodiments as illustrated in FIG. 6(d), the rotational speed S1 of the variable speed electric motor 71 varies gradually from −90 rpm to +900 rpm.

By making the variable speed electric motor 71 transit to the generator mode, the torque T1 of the variable speed electric motor 71 is prevented from exceeding the rated torque.

This mechanism will be described. By making the variable speed electric motor 71 transit to the generator mode, the planetary gear carrier 21 connected to the variable speed rotor rotates in the same direction (first direction) as the internal gear 17. Accordingly, as illustrated in FIG. 6(c), the torque transmitted from the constant speed electric motor to the variable speed electric motor 71 via a gear is released (time t2). Namely, as the planetary gear carrier 21 withstands the torque of the constant speed electric motor 51, the torque generated in the variable speed electric motor 71 is offset. Accordingly, the torque T1 of the variable speed electric motor 71 maintains the rated torque without exceeding the rated torque. As illustrated in FIG. 6(e), the rotational speed S of the sun gear shaft 12 that is the output shaft decreases temporarily.

(Electric Motor Mode Transition Step)

Next, an electric motor mode transition step in which the variable speed electric motor 71 in the electric motor mode is made to transit to the generator mode will be described.

The control unit 120 determines whether or not the rotational speed of the constant speed electric motor 51 has reached the rated rotational speed (S16). In a case where the rotational speed of the constant speed electric motor 51 has reached the rated rotational speed, the variable speed electric motor 71 returns to the electric motor mode (S17, time t3).

As illustrated in FIG. 6(a) and FIG. 6(b), in a case where the rotational speed S2 of the constant speed electric motor 51 has reached the rated rotational speed (100%), the torque T2 of the constant speed electric motor 51 sufficiently falls below the rated torque. Therefore, even if the variable speed electric motor 71 is set to the electric motor mode, the torque T1 of the variable speed electric motor 71 does not exceed the rated torque due to the torque T2 of the constant speed electric motor 51.

As the variable speed electric motor 71 transits to the electric motor mode, as illustrated in FIG. 6(e), the rotational speed S3, in the second direction, of the sun gear shaft 12 that is the output shaft starts to rise again (time t3).

Then, the variable speed accelerator 1 becomes controllable in the variable speed range (−7500 to −10500 rpm). Namely, the rotational speed of the output shaft of the transmission device 10 connected to the object to be driven is changeable by changing the rotational speed of the variable speed electric motor 71 using the rotational speed control device 100.

Additionally, the control unit 120 of the variable speed accelerator 1 of one or more embodiments is capable of execute an uncontrollable range speed control of approximating the rotational speed to the minimum rotational speed (90 rpm) in the normal direction and the minimum rotational speed (−90 rpm) in the reverse direction in a case where it is necessary to drive the variable speed electric motor 71 at a rotational speed in the uncontrollable range of (from −90 rpm to 90 rpm).

For example, if the receiving unit 121 of the control unit 120 receives an instruction for setting the rotational speed of the sun gear shaft 12 to −6000 rpm, the calculating unit 123 performs calculation and derives a calculation result that the rotational speed of the variable speed electric motor 71 for setting the rotational speed of the sun gear shaft 12 to −6000 rpm is 0 rpm.

The uncontrollable range speed control is a control of repeatedly and alternately executing a normal direction minimum rotational speed instruction P1 (refer to FIG. 8) for issuing an instruction of driving the variable speed electric motor 71 at the minimum rotational speed (90 rpm) in the normal direction, and a reverse direction minimum rotational speed instruction for issuing an instruction of driving the variable speed electric motor 71 at the minimum rotational speed in the reverse direction. The rotational speed of the variable speed electric motor 71 is approximated to a speed of about 0 rpm through this control.

Figure 8:
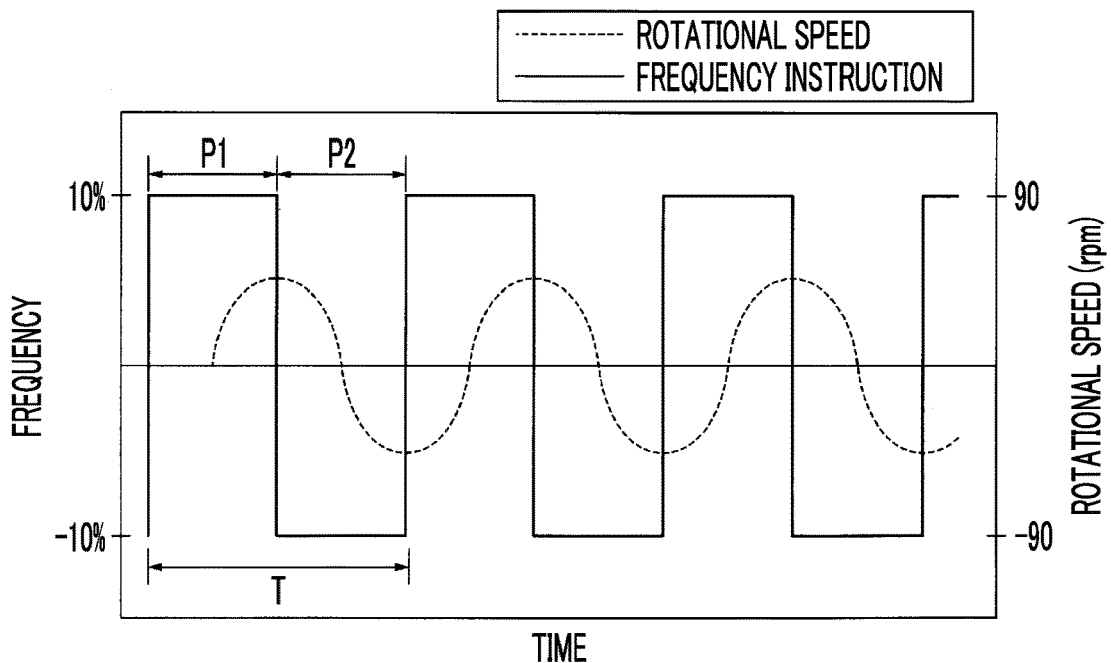
FIG. 8 is a graph illustrating a rotational speed instruction value in the uncontrollable range speed control of the variable speed electric motor of one or more embodiments of the invention.
Figure 9:
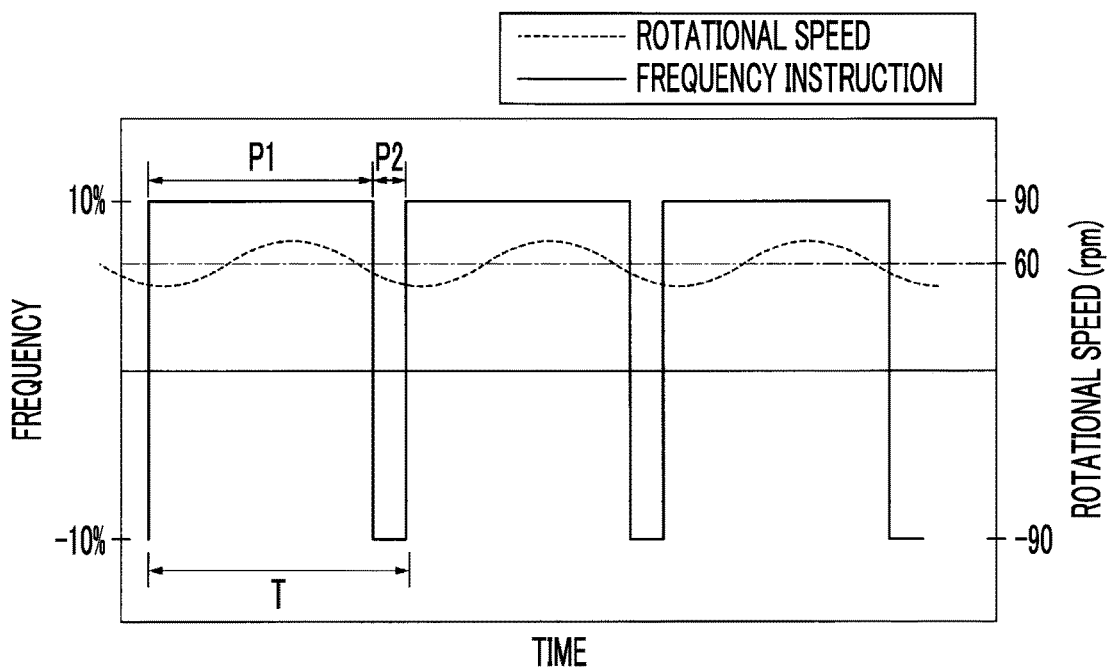
FIG. 9 is a graph illustrating a rotational speed instruction value in the uncontrollable range speed control of the variable speed electric motor of one or more embodiments of the invention.

FIG. 8 and FIG. 9 are graphs in which a horizontal axis represents time and a vertical axis represents a frequency (percentage relative to 50 Hz, illustrated by minus sign (−) in the reverse rotation) to be supplied to the variable speed electric motor 71, and the rotational speed of the variable speed electric motor 71.

If the uncontrollable range speed control is performed as illustrated in FIG. 8, the interface 122 alternately and repeatedly a command for normally rotating the variable speed rotor 72 at a frequency of 5 Hz (10% of the power frequency) and a command for reversely rotating the variable speed rotor at a frequency of 5 Hz to the rotational speed control device 100. A cycle T consisting of the normal direction minimum rotational speed instruction P1 and the reverse direction minimum rotational speed instruction P2 continuous with this instruction P1 is constant.

The times (pulse widths) of the normal direction minimum rotational speed instruction P1 and the reverse direction minimum rotational speed instruction P2 in the cycle T are equal to each other. Accordingly, the rotational speed of the variable speed electric motor 71 fluctuates in the shape of a sine curve as illustrated by a one-dot chain line. Namely, the normal rotation and the reverse rotation are repeated.

The average of the rotational speed can be 0 rpm by making the times of the normal direction minimum rotational speed instruction P1 and the reverse direction minimum rotational speed instruction P2 equal to each other. Namely, the rotational speed can be approximated to 0 rpm while rotating the variable speed rotor 72.

Next, a control method in a case where the rotational speed of the variable speed electric motor 71 is in the uncontrollable range and is other than 0 rpm will be described.

In a case where the instructed rotational speed of the output shaft Ao is −5700 rpm, the rotational speed of the variable speed electric motor 71 derived by the calculating unit 123 is 60 rpm. Since 60 rpm is in the uncontrollable range of the variable speed electric motor 71, the control unit 120 executes the uncontrollable range speed control.

As illustrated in FIG. 9, the control unit 120 makes the times of the normal direction minimum rotational speed instruction P1 and the reverse direction minimum rotational speed instruction P2 different from each other for approximation to 60 rpm. Specifically, the time of the normal direction minimum rotational speed instruction P1 is lengthened and the time of the reverse direction minimum rotational speed instruction P2 is shortened such that the average value of the rotational speed of the variable speed electric motor 71 is 60 rpm.

Here, for example, if P1:P2=5:5, the rotational speed can be approximated to 0 rpm, and if P1:P2=100, the rotational speed is 90 rpm. In this way, the rotational speed of the uncontrollable range can be approximated by making the ratio of the normal direction minimum rotational speed instruction P1 and the reverse direction minimum rotational speed instruction P2 variable. The approximated rotational speed (average rotational speed of the variable speed electric motor 71) of the variable speed electric motor 71 approaches 90 rpm by increasing the proportion of the normal direction minimum rotational speed instruction P1, and the approximated rotational speed of the variable speed electric motor 71 approaches −90 rpm by increasing the proportion of the reverse direction minimum rotational speed instruction P2.

In controlling the rotational speed of the output shaft Ao of the variable speed accelerator 1 through the uncontrollable range speed control, the degree of freedom of the rotational speed can be further enhanced. Namely, in a case where the rotational speed is set to the uncontrollable range of the variable speed electric motor 71, the rotational speed of the output shaft can be approximated to a desired rotational speed by rotationally driving the variable speed electric motor 71 such that the average rotational speed is the rotational speed.

According to the above-described embodiments, when the torque of the constant speed electric motor 51 exceeds the rated torque at the starting of the variable speed accelerator 1 including the electric device 50 consisting of the constant speed electric motor 51 and the variable speed electric motor 71, and the planetary gear transmission device 10 that shifts the rotational drive force generated by the electric device 50 to transmit the changed speed to the object to be driven, it is possible to control the rotational direction of the rotor of the variable speed electric motor 71, thereby preventing the torque of the variable speed electric motor 71 from exceeding the rated torque. Accordingly, it is unnecessary to enlarge the capacity of the variable speed electric motor 71, and the manufacturing cost of the variable speed accelerator 1 can be reduced.

Additionally, in one or more embodiments, the constant speed rotor 52 of the constant speed electric motor 51 and the variable speed rotor 72 of the variable speed electric motor 71 are disposed on the axis Ar of the transmission device 10. Thus, it is possible to reduce the size as a whole compared to a case where the constant speed rotor 52 and the variable speed rotor 72 are disposed at positions radially away from the axis Ar of the transmission device 10. Moreover, in one or more embodiments, it is not necessary to provide transmission mechanisms, such as a belt and a pulley, unlike a case where the constant speed rotor 52 and the variable speed rotor 72 are disposed at positions radially away from the axis Ar of the transmission device 10. Therefore, from this viewpoint, it is possible to reduce the size of the device and reduce the manufacturing cost according to a reduction in the number of components. Additionally, in one or more embodiments, it is not necessary to provide transmission mechanisms, such as a belt and a pulley, unlike a case where the constant speed rotor 52 and the variable speed rotor 72 are disposed at positions radially away from the axis Ar of the transmission device 10.

Therefore, a bending load is not applied from the belt to a shaft located on the axis Ar of the transmission device 10, so that vibration can also be reduced.

In one or more embodiments, the constant speed rotor 52 of the electric device 50 and the constant speed input shaft Ac of the transmission device 10 are connected together by the constant-speed flexible coupling 97. Thus, it is possible to allow eccentricity, deflection angle, and runout between the constant speed rotor 52 and the constant speed input shaft Ac. Moreover, in one or more embodiments, the variable speed rotor 72 of the electric device 50 and the variable speed input shaft Av of the transmission device 10 are connected together by the variable-speed flexible coupling 95. Thus, it is possible to allow eccentricity, deflection angle, and runout between the variable speed rotor 72 and the variable speed input shaft Av. For this reason, in one or more embodiments, the time and efforts for the alignment work of the transmission device 10 with respect to the electric device 50 can be minimized, transmission of the axial runout from the electric device 50 to the transmission device 10 and transmission of the axial runout from the transmission device 10 to the electric device 50 can be suppressed.

In one or more embodiments, the variable speed electric motor casing 81 is fixed to the constant speed electric motor casing 61. For this reason, in one or more embodiments, before forwarding from a manufacturing factory of variable electric motor systems, the variable speed rotor 72 can be accurately positioned (aligned) with respect to the constant speed rotor 52. Therefore, in one or more embodiments, the positioning work of the variable speed rotor 72 with respect to the constant speed rotor 52 can be excluded on an installation spot.

In one or more embodiments, if the constant speed rotor rotates, the cooling fan 91 provided at the end of the constant speed rotor 52 also rotates. Due to the rotation of the cooling fan 91, external air flows into the constant speed electric motor casing 61 to cool the constant speed rotor 52, the constant speed stator 66, and the like. Moreover, in one or more embodiments, the constant speed electric motor casing 61 and the variable speed electric motor casing 81 communicate with each other, the air that has flowed into the constant speed electric motor casing 61 also flows into the variable speed electric motor casing 81 to cool the variable speed rotor 72, the variable speed stator 86, and the like. Therefore, in one or more embodiments, the two electric motors can be cooled by one cooling fan 91. From this viewpoint, the size of the device and the manufacturing cost can be reduced.

Additionally, in one or more embodiments, a space (installation space) for installing the variable electric motor system can be reduced by disposing the constant speed rotor 52, the variable speed rotor 72, and the sun gear shaft 12 on the same axis. Additionally, a component (bevel gear or the like) for transmitting rotation becomes unnecessary, an increase in the number of components can be suppressed, and the manufacturing cost can be reduced.

Additionally, in one or more embodiments, the constant speed rotor shaft 53 (constant speed rotor extension shaft 55) that is a rod-shaped shaft is inserted through the variable speed rotor shaft 73 that is a cylindrical shaft in which the shaft insertion hole 74 is formed. Namely, the constant speed rotor shaft 53 of the constant speed electric motor 51 with a large output is inserted through the variable speed rotor shaft 73 of the variable speed electric motor 71 having a smaller output than the constant speed electric motor 51. Accordingly, the constant speed electric motor 51 with a large output (horsepower) can be adopted.

Additionally, in one or more embodiments, the overall device can be made compact by linearly disposing the constant speed electric motor 51, the variable speed electric motor 71, the transmission device, and the compressor C in this order.

Hereinafter, a variable speed accelerator having a starting control device for a variable speed accelerator of one or more embodiments of the invention will be described in detail, referring to the drawings. In one or more embodiments, differences from the above-described embodiments will be mainly described, and the description of similar portions will be omitted.

The variable speed accelerator 1 of one or more embodiments includes a rotational speed measuring device 124 (refer to FIG. 1) that measures the rotational speed S1 of the variable speed electric motor 71.

In the rotational speed control device 100 of the starting control device 2 of one or more embodiments, the calculating unit 123 of the control unit 120 is characterized by calculating an instruction obtained by taking the slip of the variable speed electric motor 71 and the control delay of the control unit 120 into consideration in the generator mode transition step in which the variable speed electric motor 71 in the electric motor mode is made to transit to the generator mode.

In the starting control device 2 of the above-described embodiments, the control unit 120 performs the control of gradually changing the rotational speed S1 of the variable speed electric motor 71 in a predetermined time in the generator mode transition step.

Figure 10:
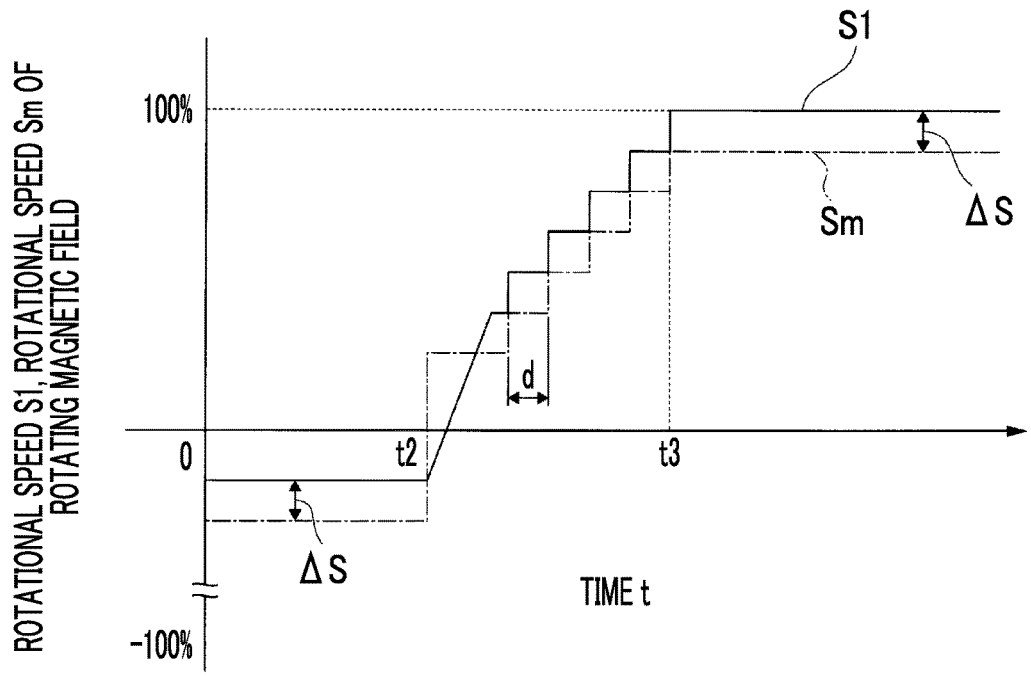
FIG. 10 is a graph illustrating the rotational speed of a variable speed electric motor of one or more embodiments of the invention.

FIG. 10 is a graph of the rotational speed S1 of the variable speed electric motor 71 according to the starting control device 2 of one or more embodiments, and the rotational speed Sm of a rotating magnetic field generated in order to rotate the variable speed electric motor 71.

In FIG. 10, a horizontal axis represents time t, and the vertical axis represents a rotational speed Sm (synchronous speed) of a rotating magnetic field caused by a frequency fr (hereinafter referred to as a command frequency fr) of the electric power calculated by the calculating unit 123, and a rotational speed S1 (actual rotational speed, hereinafter referred to as an actual rotational speed S1) of the variable speed electric motor 71.

A difference between the rotational speed Sm of the rotating magnetic field and the actual rotational speed S1 is a slip rate ΔS. In other words, the rotational speed Sm of the rotating magnetic field and the actual rotational speed S1 do not coincide with each other, and a difference resulting from the slip is generated between the speeds. The slip rate ΔS results from mechanical slip or inertia.

The calculating unit 123 calculates an instruction for changing the command frequency fr in a stepwise fashion. This stepwise change in the frequency of the electric power results from the calculation cycle of the control unit 120. This instruction is sent to the frequency conversion unit 101 via the interface 122. Accordingly, the rotational speed Sm of the rotating magnetic field of the variable speed electric motor 71 varies in a stepwise fashion, and the actual rotational speed S1 varies in a stepwise fashion.

In the case of the variable speed electric motor 71 connected to the rotor of the compressor C that is the object to be driven, the actual rotational speed S1 and the rotational speed Sm of the rotating magnetic field have a relationship expressed by the following Equation (2) via the transmission device 10.

$$S1 > Sm \quad (2)$$

Figure 11:
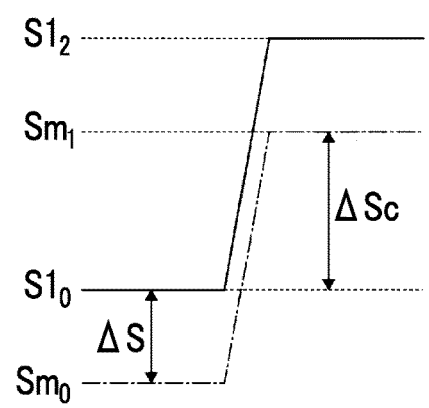
FIG. 11 is a graph for explaining the details of a control method for the variable speed electric motor of one or more embodiments of the invention.

As illustrated in FIG. 11, in the electric motor mode (minus side), the absolute value of the actual rotational speed S1 is smaller than the absolute value of the rotational speed Sm of the rotating magnetic field.

In the generator mode (plus side), the absolute value of the actual rotational speed S1 is larger than the absolute value of the rotational speed Sm of the rotating magnetic field.

In either case, the difference between the actual rotational speed S1 and the rotational speed Sm of the rotating magnetic field is ΔS.

Here, in the generator mode, as the rotational energy of the compressor C is exerted, the actual rotational speed S1 may become larger than the sum of the rotational speed Sm of the rotating magnetic field, and the slip rate ΔS.

The inventors have found that the interval of the calculation cycle of the control unit 120 is long (the clock frequency of the computer is low) in a case where control is performed in the generator mode transition step, and the amount of change in the actual rotational speed S1 becomes larger than the amount of change in the rotational speed Sm of the rotating magnetic field, and consequently, the rotational speed of the variable speed electric motor 71 cannot be appropriately controlled in a case where the rotational speed Sm of the rotating magnetic field cannot follow a change in the actual rotational speed S1.

The calculating unit 123 of one or more embodiments calculates the frequency fr of the electric power to be supplied to the variable speed electric motor 71 using the following Equation (3).

$$fr = f0 + \Delta fs + \Delta fc \quad (3)$$

f0 is the frequency (initial frequency) of electric power before being changed.

Δfs is the frequency (slip frequency) of electric power corresponding to the slip rate Δs. Δfs may be calculated from the difference between the rotational speed Sm of the rotating magnetic field, and the actual rotational speed S1, or may be a default value based on the specification of the variable speed electric motor 71.

Δfc is a correction value of the command frequency fr obtained by taking the control delay into consideration. Δfc can be set by simulation or the like in accordance with the device configuration of the variable speed accelerator 1 and the compressor C.

Namely, the command frequency fr calculated by the calculating unit 123 of one or more embodiments is a frequency obtained by taking the control delay of the control unit 120 into consideration. Here, f0+Δfs may be calculated from the actual rotational speed S1 measured by the rotational speed measuring device 124 or the output current of the variable speed electric motor 71.

As illustrated in FIG. 11, in a first stage F1, as the electric power of the initial frequency f0 is supplied, the rotational speed of the rotating magnetic field is Sm0, and the actual rotational speed is S10.

In a second stage F2, the frequency fr is calculated using Equation (3). Namely, the command frequency fr is calculated in consideration of the slip rate ΔS and the control delay. Accordingly, the rotational speed of the rotating magnetic field is Sm1, and the actual rotational speed is S11. Namely, the rotational speed Sm of the rotating magnetic field changes to the rotational speed Sm1 to which a rotational speed ΔSc obtained by taking the slip rate ΔS and the control delay into consideration is added.

Hereinafter, the frequency fr is calculated in the calculation cycle of the control unit 120 until a target rotational speed is reached.

According to the above-described embodiments, the rotational speed of the variable speed electric motor 71 can be appropriately controlled by calculating the command frequency fr in consideration of the control delay. Namely, the variable speed rotor 72 can be prevented from overspeeding due to the control delay.

In addition, in the above-described embodiments, the constant speed rotor 52, the variable speed rotor 72, and the sun gear shaft 12 are disposed on the same axis. However, the invention is not limited to this. For example, the variable speed electric motor 71 may be disposed such that an axis of the variable speed rotor 72 is parallel to an axis of the constant speed rotor 52 and these rotors are different positions.

Additionally, in the above-described embodiments, the four-pole induction motor is exemplified as the constant speed electric motor 51 suitable for rotating the compressor C at a high speed, and the six-pole induction motor is exemplified as the variable speed electric motor 71 suitable for variably changing the rotational speed of the compressor C within a certain range. However, in a case where it is not necessary to rotate the object to be driven at a high speed, other types of electric motors may be used as the constant speed electric motor 51 or the variable speed electric motor 71.

Additionally, in the above-described embodiments, the shaft insertion hole 74 is formed in the variable speed rotor and the constant speed rotor 52 is inserted through the shaft insertion hole 74. However, a configuration may be adopted in which a shaft insertion hole is formed in a constant speed rotor and a variable speed rotor is inserted through this shaft insertion hole.

Additionally, in the above-described embodiments, the variable-speed flexible coupling 95 that connects the variable speed rotor 72 and the variable speed input shaft Av together forms a first flexible coupling, and the constant-speed flexible coupling 97 that connects the constant speed rotor 52 and the constant speed input shaft Ac together forms a second flexible coupling. However, in a case where the constant-speed flexible coupling is disposed on an outer peripheral side of the variable-speed flexible coupling, the constant-speed flexible coupling forms the first flexible coupling, and the variable-speed flexible coupling forms the second flexible coupling.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: VARIABLE SPEED ACCELERATOR
2: STARTING CONTROL DEVICE FOR VARIABLE SPEED ACCELERATOR
10: TRANSMISSION DEVICE (PLANETARY GEAR TRANSMISSION DEVICE)
105: TRANSMISSION DEVICE SUPPORT PART
11: SUN GEAR
12: SUN GEAR SHAFT
15: PLANETARY GEAR
17: INTERNAL GEAR

21: PLANETARY GEAR CARRIER
22: PLANETARY GEAR SHAFT
23: CARRIER BODY
27: PLANETARY GEAR CARRIER SHAFT
27i: INPUT-SIDE PLANETARY GEAR CARRIER SHAFT
28: FLANGE
31: INTERNAL GEAR CARRIER
33: CARRIER BODY
37: INTERNAL GEAR CARRIER SHAFT
38: FLANGE
41: TRANSMISSION CASING
50: ELECTRIC DEVICE
50S: ELECTRIC DEVICE SUPPORT PART
51: CONSTANT SPEED ELECTRIC MOTOR
52: CONSTANT SPEED ROTOR
53: CONSTANT SPEED ROTOR SHAFT
54: CONSTANT SPEED ROTOR BODY SHAFT
55: CONSTANT SPEED ROTOR EXTENSION SHAFT
56: CONDUCTOR
61: CONSTANT SPEED ELECTRIC MOTOR CASING
62: CASING BODY
63i, 63o: LID
64: OPENING
66: CONSTANT SPEED STATOR
71: VARIABLE SPEED ELECTRIC MOTOR
71S: VARIABLE SPEED ELECTRIC MOTOR SUPPORT PART
72: VARIABLE SPEED ROTOR
73: VARIABLE SPEED ROTOR SHAFT
73o: FLANGE
74: SHAFT INSERTION HOLE
76: CONDUCTOR
81: VARIABLE SPEED ELECTRIC MOTOR CASING
82: CASING BODY
83i, 83o: LID
84: OPENING
86: VARIABLE SPEED STATOR
91: COOLING FAN
100: FREQUENCY CONVERTING DEVICE
101: FREQUENCY CONVERSION UNIT
102: ROTATIONAL DIRECTION CHANGING UNIT
111: FIRST SWITCH
112: SECOND SWITCH
113: FIRST CURRENT VALUE MEASURING DEVICE
114: SECOND CURRENT VALUE MEASURING DEVICE
116: CARRIER BODY
117: TRANSMISSION PART
118: CARRIER SHAFT GEAR
119: CARRIER BODY GEAR
120: CONTROL UNIT
Ap: CENTER AXIS
Ar: AXIS

The invention claimed is:

1. A starting method for a variable speed accelerator, wherein the variable speed accelerator comprises:
an electric device that generates a rotational drive force, and
a transmission device that shifts the rotational drive force generated by the electric device and transmits the changed speed to an object to be driven,
the transmission device comprises:
a sun gear that rotates about an axis,
a sun gear shaft that is fixed to the sun gear and extends in an axial direction about the axis,
a planetary gear that meshes with the sun gear, revolves around the axis, and rotates about its own center axis,
an internal gear comprising a plurality of teeth aligned annularly about the axis and meshes with the planetary gear,
a planetary gear carrier comprising a planetary gear carrier shaft extending in the axial direction about the axis and supports the planetary gear so as to be revolvable around the axis and rotatable about the center axis of the planetary gear, and
an internal gear carrier comprising an internal gear carrier shaft extending in the axial direction about the axis and supports the internal gear so as to be rotatable about the axis,
the electric device comprises:
a constant speed electric motor comprising a constant speed rotor that rotates the internal gear carrier shaft of the transmission device in a first direction, and
a variable speed electric motor comprising a variable speed rotor connected to the planetary gear carrier shaft of the transmission device, functions as a generator in a generator mode in which the variable speed rotor rotates in the first direction, and functions as an electric motor in an electric motor mode in which the variable speed rotor rotates in the second direction that is an opposite direction to the first direction, and
the starting method for the variable speed accelerator comprises:
a variable speed electric motor start-up step in which the variable speed electric motor is started up at approximately a minimum rotational speed of the electric motor mode;
a constant speed electric motor start-up step in which the constant speed electric motor is started up and the rotational speeds of the constant speed rotor and the internal gear in the first direction are gradually increased;
a generator mode transition step in which the variable speed electric motor is made to set to the generator mode when a current value of the variable speed electric motor has reached a predetermined current value; and
an electric motor mode transition step in which the variable speed electric motor is made to return to the electric motor mode when the rotational speed of the constant speed electric motor has reached its rated rotational speed.

2. The starting method for a variable speed accelerator according to claim 1, wherein, in the generator mode transition step, the variable speed electric motor transits to the generator mode when the current value of the variable speed electric motor has reached a rated current.

3. A starting control device for a variable speed accelerator, wherein
the variable speed accelerator comprises:
an electric device that generates a rotational drive force, and
a transmission device that shifts the rotational drive force generated by the electric device and transmits the changed speed to an object to be driven,
the transmission device comprises:
a sun gear that rotates about an axis,
a sun gear shaft that is fixed to the sun gear and extends in an axial direction about the axis,
a planetary gear that meshes with the sun gear, revolves around the axis, and rotates about its own center axis, an internal gear comprising a plurality of teeth aligned annularly about the axis and meshes with the planetary gear, a planetary gear carrier comprising a planetary gear carrier shaft extending in the axial direction about the axis and supports the planetary gear so as to be revolvable around the axis and rotatable about a center axis of the planetary gear, and an internal gear carrier comprising an internal gear carrier shaft extending in the axial direction about the axis and supports the internal gear so as to be rotatable about the axis, the electric device comprises:

a constant speed electric motor comprising a constant speed rotor that rotates the internal gear carrier shaft of the transmission device in a first direction, and a variable speed electric motor comprising a variable speed rotor connected to the planetary gear carrier shaft of the transmission device, functions as a generator in a generator mode in which the variable speed rotor rotates in the first direction, and functions as an electric motor in an electric motor mode in which the variable speed rotor rotates in the second direction that is an opposite direction to the first direction, and the starting control device for the variable speed accelerator comprises:

a frequency converting device that changes a frequency of electric power to be supplied to the variable speed electric motor;

a first switch that brings the variable speed electric motor into an electric power supply state and electric power cutoff state;

a second switch that brings the constant speed electric motor into an electric power supply state and an electric power cutoff state;

a first current value measuring device that measures a current value of the variable speed electric motor;

a second current value measuring device that measures a current value of the constant speed electric motor; and a controller that instructs the frequency converting device regarding a frequency of electric power to be supplied to the variable speed electric motor and instructs the first switch and the second switch to be turned on and off, wherein the controller instructs the first switch to be turned on so as to bring the variable speed electric motor into the electric power supply state if an instruction for starting is received, and instructs the second switch to be turned on so as to bring the constant speed electric motor into the electric power supply state after the frequency converting device is instructed on a predetermined minimum frequency and the variable speed electric motor begins to be driven at a minimum rotational speed in the electric motor mode, wherein the controller is configured to set the variable speed electric motor to the generator mode when the current value of the variable speed electric motor has reached a predetermined current value, and wherein the controller is configured to return the variable speed electric motor to the electric motor mode when the rotational speed of the constant speed electric motor has reached its rated rotational speed.

4. The starting control device for a variable speed accelerator according to claim 3, wherein the controller calculates a frequency by taking slip of the variable speed electric motor and control delay into consideration when the variable speed electric motor is made to transit to the generator mode.

* * * * *